Figure 1:
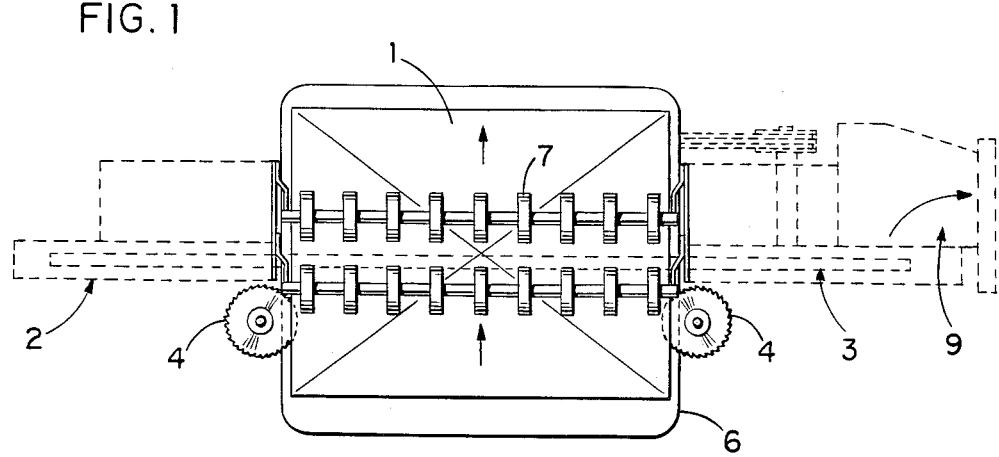

United States Patent [19]

Gendron

[11] Patent Number: 4,612,837
[45] Date of Patent: Sep. 23, 1986

[54] APPARATUS FOR PRODUCING SLOPING PANELS

[76] Inventor: Florian Gendron, 7092 Levesque St., Anjou, Quebec, Canada, H1K 2P7

[21] Appl. No.: 462,330

[22] Filed: Jan. 31, 1983

[30] Foreign Application Priority Data

Feb. 1, 1982 [CA] Canada ................................. 395343

[51] Int. Cl.⁴ ............................................ B26D 11/00
[52] U.S. Cl. ....................................... 83/864; 83/862; 83/920; 83/790
[58] Field of Search ................. 83/862, 864, 425, 436, 83/401, 790, 404, 788, 920, 422, 404.1, 437; 144/13, 41

[56] References Cited

U.S. PATENT DOCUMENTS

| 348,281 | 8/1886 | Hinkley | 83/790 |
| 358,003 | 2/1887 | Turner et al. | 83/401 |
| 470,964 | 3/1892 | Anderson | 83/401 |
| 1,421,204 | 6/1922 | Fritz | 83/790 |
| 4,215,613 | 8/1980 | Anderson et al. | 83/864 |

FOREIGN PATENT DOCUMENTS

| 55-42715 | 3/1980 | Japan | 83/864 |
| 317506 | 1/1972 | U.S.S.R. | 83/790 |

Primary Examiner—Donald R. Schran
Assistant Examiner—James L. Wolfe
Attorney, Agent, or Firm—Fleit, Jacobson, Cohn & Fleit

[57] ABSTRACT

An apparatus for producing sloping roof insulation panels and more particularly, roof insulation panels made of glass fiber material covered by a base cap layer. Such apparatus includes a circular saw capable of producing a groove in at least one of the side surfaces of the panel and a band saw for cutting the panel into a first portion including at least part of the top surface of the panel and a second portion including at least a part of the bottom surface of the panel. The band saw is located in alignment with the groove or grooves produced by the circular saw.

11 Claims, 3 Drawing Figures

U.S. Patent    Sep. 23, 1986    4,612,837

APPARATUS FOR PRODUCING SLOPING PANELS

This invention relates to an apparatus for producing panels and more particularly sloping base cap roof insulation panels.

Modular sloping roofing panels are well known in the art. Some are molded while others are cut using different types of apparatuses from panels having the shape of a rectangular prism. Such panels usually have a top surface and bottom surface, two end surfaces and two side surfaces. Such panels are frequently cut to produce a sloping top surface. One known type of apparatus used to cut such panels comprises a band or ribbon saw.

When the roof insulation panel is made of inorganic glass fibers, it is highly desirable to surface the inorganic glass fibers with an impact resistant asphalt and kraft layer or other known products in order to add to the weathering life of the roof and insure positive adhesion with the moping asphalt used to bond the built-up roof to the insulation panels. Such a layer is usually called a "base cap". Frequently, such base cap layers are provided on at least the bottom surface of the roof insulation panel. In many instances, such base cap layers are also provided on at least one of the side surfaces of the roof insulation panel.

In such instances, the teeth of the band or ribbon saw traditionally used to provide the slope to the panel, have had a tendency to rapidly clog, thus necessiting the replacement of the saw blade or the cleaning of the teeth with the saw blade remaining in place. Both alternatives resulting in considerable downtime. The present invention relates to an apparatus which considerably reduces the amount of clogging occurring during the cutting operation.

The invention consists in an apparatus comprising:

(a) circular saw means capable of producing a groove in a least one of the side surfaces of the panel;

(b) cutting means for cutting said panels into at least a first portion comprising at least a part of the top surface and a second portion comprising at least part of said bottom surface;

said cutting means being in alignment with the groove produced by said circular saw means. Thus, the cutting means do not get clogged as rapidly. The saw blades of the circular saw means do get clogged relatively rapidly but they can be easily and extremely rapidly removed and replaced with fresh blades while the clogged blades are being cleaned. Thus, the machine downtime is reduced to a minimum and production can be increased considerably.

Figure 2:
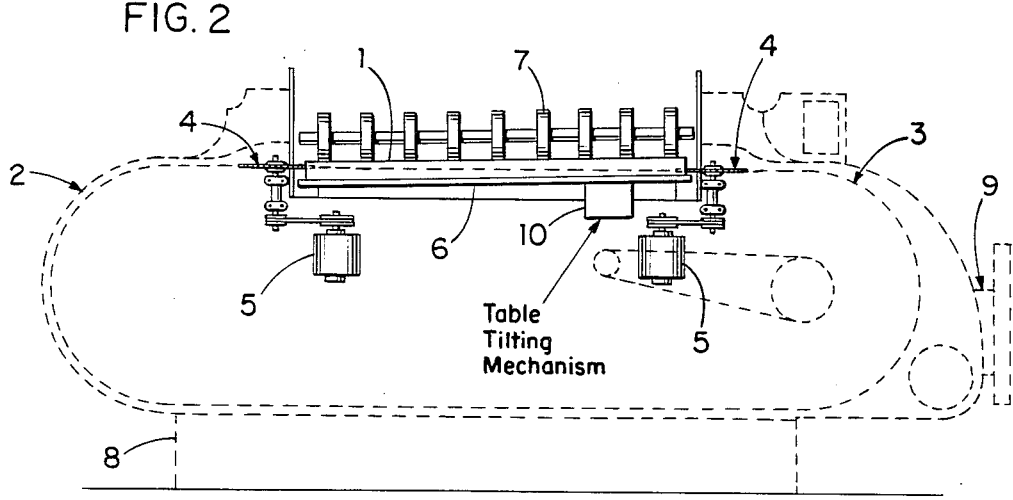
Figure 3:
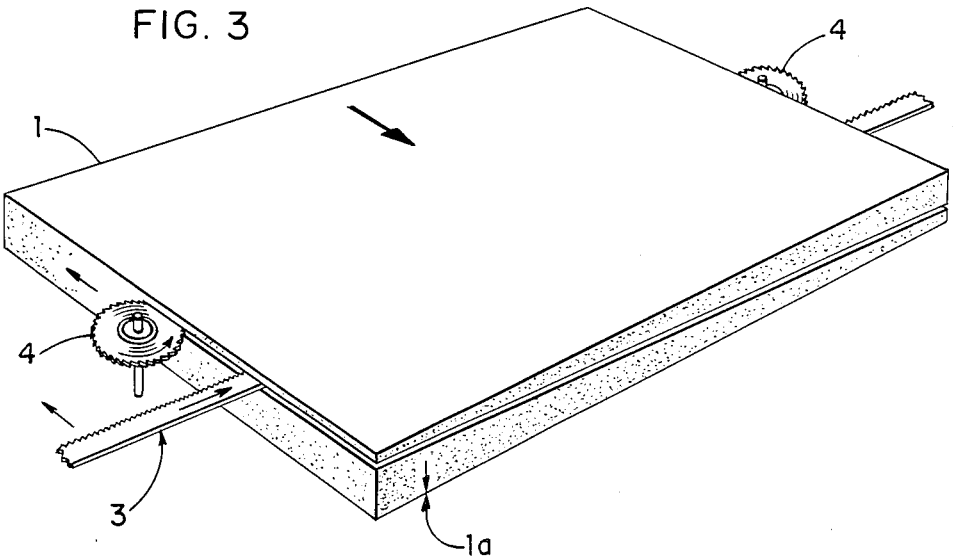

In drawings which illustrate an embodiment of the invention:

FIG. 1 is a top plan view of one embodiment;
FIG. 2 is an elevation of this embodiment;
FIG. 3 is a partial enlarged perspective view of part of this embodiment.

The apparatus illustrated in FIGS. 1 and 2 comprises a table 6 on which panel 1 having the shape of a rectangular prism made of glass fibers and covered with a base cap is introduced with a view to produce an inclined roof panel. A ribbon saw generally shown in 3 is driven by any known means while table 6 is adjusted by table tilting mechanism 10 to produce the required slope in panel 1. Two series of rolls 7 are provided to restrict vertical movement of panel 1 during the cutting operation. Similarly, lateral guides (not shown) are provided so that the panel 1 is correctly cut by ribbon saw 3. The general external outline of the apparatus is shown by dotted lines.

A vacuum cleaner generally shown in 9 removes the dust produced during the cutting operation.

A circular saw 4 is provided on each side of the panel and are arranged such that:

they cut through the base cap on each side of panel 1 ribbon saw 3 passes directly through the cut or groove made by circular saws 4.

These circular saws 4 are driven by any known means for example, motors 5. In operation, a panel 1 is introduced onto table 6 and pushed into the bite of circular saws 4. The panel then enters into the bite of a first series of rollers 7. The panel is then cut by ribbon saw 3 and fed into the bite of a second series of rollers 7. The cut panel is then removed from table 6.

Although, the invention has been described in relation to a specific embodiment, it should not be limited thereto as many variations may be made which do not affect the substance of the invention.

The embodiment of the invention in which an exclusive property or privilege is claimed are defined as follows:

1. An apparatus for cutting roof panels, each roof panel having a top surface, a bottom surface, a first side surface, a second side surface, and two end surfaces, said apparatus comprising:

a table;

means for adjusting said table according to a desired angle of cut of said roof panels;

engaging means for engaging said roof panels to bias said roof panels towards said table so that said roof panels are held between said table and said engaging means during a cutting operation;

circular saw means for cutting a groove in at least one of said side surfaces of each roof panel;

band saw means being located downstream from said circular saw means and being operable with said circular saw means for cutting each of said roof panels into at least a first portion including at least a part of said top surface, and a second portion including at least a part of said bottom surface; and a cutting edge of said band saw means being in alignment with the plane of the groove cut by said circular saw means to sever each roof panel by said band saw means cutting through said groove cut in each roof panel by said circular saw means so that when the roof panels are passed by said table, said circular saw means, and said band saw means, the roof panels are cut at said desired angle.

2. An apparatus as described in claim 1 wherein a separate saw means is provided for each said side surface.

3. An apparatus as described in claim 1 wherein a base cap layer is provided on at least one of said side surfaces.

4. An apparatus as described in claim 2 wherein a base cap layer is provided on at least one of said side surfaces.

5. An apparatus as described in claim 3 wherein said base cap layer comprises an asphaltic component.

6. An apparatus for cutting roof panels, each roof panel having a top surface, a bottom surface, a first side surface, a second side surface, two end surfaces, and a base cap located on the bottom surface and possibly on at least one of the side surfaces, said apparatus comprising:

a table;

a surface of said table providing a path of travel for said roof panels;

means for adjusting said table, said roof panels being tilted according to the position of said table;

engaging means for engaging said roof panels to bias said roof panels towards said table so that said roof panels are held between said table and said engaging means during a cutting operation;

circular saw means located on at least one side of said path of travel for cutting a groove in said base cap located on each of said roof panels, said groove extending inwardly from at least one of said first side surface and said second side surface, said groove extending into each of said roof panels at an angle according to the position of the table relative to said circular saw means; and band saw means located downstream from said circular saw means along the path of travel of said roof panels, and said band saw means being operable with said circular saw means as the roof panels pass across the table for cutting said roof panels through a plane extending through said groove cut by said circular saw means, each of said roof panels being cut by said band saw means into two portions through the groove extending through the base cap.

7. An apparatus for cutting roof panels according to claim 1, wherein said engaging means includes a roller.

8. An apparatus for cutting roof panels according to claim 6, wherein said engaging means includes a roller.

9. An apparatus for cutting roof panels according to claim 7, wherein a periphery of said roller is spaced from said table at a distance equal to a height of said roof panels.

10. An apparatus for cutting roof panels according to claim 8, wherein a periphery of said roller is spaced from said table at a distance equal to a height of said roof panels.

11. An apparatus for cutting roof panels, each roof panel having a top surface, a bottom surface, a first side surface, a second side surface, and two end surfaces, said apparatus comprising:

a table for receiving said roof panels as said roof panels are moved across a surface of said table during a cutting operation;

means for adjusting said table according to a desired angle of cut of said roof panels;

engaging means located spaced above said table at a distance substantially equal to a height of said roof panels to bias said roof panels towards said table so that said roof panels are held between said table and said engaging means during said cutting operation;

circular saw means located on opposite sides of said table and downstream from a leading edge of said table for cutting a groove in said first side surface and said second surface of each roof panel as said roof panels move across said table;

band saw means located downstream from said circular saw means for cutting each of said roof panels into a first portion including at least a part of said top surface, and a second portion including at least a part of said bottom surface; and a cutting edge of said band saw means being aligned with the plane of said groove cut by said circular saw means so that said roof panels are cut at said desired angle as the roof panels move across said table and are cut by said circular saw means and said band saw means.

* * * * *